Dec. 17, 1968 D. A. LACE 3,417,268

MOVING COIL ELECTRO-MECHANICAL DEVICE

Filed Aug. 25, 1964 6 Sheets-Sheet 1

INVENTOR.
DONALD A. LACE
BY
William C Babcock
ATTORNEY

Dec. 17, 1968 D. A. LACE 3,417,268

MOVING COIL ELECTRO-MECHANICAL DEVICE

Filed Aug. 25, 1964 6 Sheets-Sheet 2

INVENTOR.
DONALD A. LACE
BY
William C. Babcock
ATTORNEY

Dec. 17, 1968 D. A. LACE 3,417,268

MOVING COIL ELECTRO-MECHANICAL DEVICE

Filed Aug. 25, 1964 6 Sheets-Sheet 3

INVENTOR.
DONALD A. LACE

BY William C Babcock

ATTORNEY

Dec. 17, 1968 D. A. LACE 3,417,268

MOVING COIL ELECTRO-MECHANICAL DEVICE

Filed Aug. 25, 1964 6 Sheets-Sheet 4

INVENTOR.
DONALD A. LACE
BY
William C. Babcock
ATTORNEY

INVENTOR.
DONALD A. LACE
BY
William C Babcock
ATTORNEY

Dec. 17, 1968 D. A. LACE 3,417,268

MOVING COIL ELECTRO-MECHANICAL DEVICE

Filed Aug. 25, 1964 6 Sheets-Sheet 6

INVENTOR.
DONALD A. LACE
BY
William C Babcock
ATTORNEY

United States Patent Office 3,417,268
Patented Dec. 17, 1968

3,417,268
MOVING COIL ELECTRO-MECHANICAL DEVICE
Donald A. Lace, Long Beach, Calif.
(5041 Galway Circle, Huntington Beach, Calif. 92642)
Filed Aug. 25, 1964, Ser. No. 391,840
8 Claims. (Cl. 310—27)

ABSTRACT OF THE DISCLOSURE

A linear oscillatory motion device in which a spider-like member is mounted to a shaft and carries a power coil arranged to reciprocate within a permanent magnet created flux field. The coil is alternately energized by electric current in such manner that it is repelled from the field periodically. In the case of DC actuation, the shaft carries switching means to make and break the circuit. In the case of AC actuation the reversal of current flow energizes the coil. Spring means are provided to restore the spider-shaft to its static position while effecting the power stroke. As applied to a speaker the spider function is performed by the speaker diaphragm and the power coil function is performed by the voice coil which is mounted to the diaphragm.

A feedback coil is also mounted to the diaphragm and subjected to coordinate movement with the voice coil. A negative feedback signal is generated by the feedback coil which is related to the wave pattern in the voice coil and is fed back to the audio amplifier to cancel out distortions in the reproduced sounds.

The present invention relates generally to the field of electro-mechanical devices, and more particularly to one in which a shaft, spider and coil of unitary structure is selectively responsive to direct current, alternating current and mechanical movement to provide a useful function.

A major object of the invention is to provide a multi-purpose device in which an assembly of a coil, spider and shaft is so supported that it first moves as a unit either forwardly or rearwardly, depending on the polarity of direct current supplied thereto; secondly, said unit oscillates longitudinally when energized by an alternating current; and thirdly, said unit discharges an electric current when it is moved relative to the balance of the device, with the direction of movement being indicated by the polarity of the discharging current of one or more of the coils.

A further object of the invention is to supply a device in which said unit is normally disposed in a first position, but moves therefrom to a second latched position when current is supplied to the coil, with said unit remaining in said second latched position until current of a predetermined magnitude is again supplied to said coil.

Yet another object of the invention is to provide a device of the type described that imparts a particularly desirable oscillatory motion to a shaft when the same is employed as a striker in conjunction with a bell.

Still a further object of the invention is to supply a device that can be advantageously incorporated in a speaker or horn actuating mechanism, as well as provide a motor for wet and gas pumps, paint sprayers, hair spray dispensers, and the like.

Yet a further object of the invention is to furnish a device which operates equally well in any position and is particularly adapted for such additional uses as opening and closing switches, precision positioning of an element, vibrating a shaker, operating a camera shutter, and the like.

Still another object of the invention is to provide a true linear oscillatory motor that can be actuated by alternating current or direct current and the polarity of which is periodically reversed by switching means forming a part of device, and in which device the flux of the magnetic field shifts as the device operates to obtain maximum torque output.

Yet still another object of the invention is to provide a sound reproduction unit in which the sound is reproduced with a minimum of distortion.

These and other objects and advantages of the present invention will become apparent from the following description of various forms thereof, and from the accompanying drawings illustrating the same, in which.

Figures 2, 3, 17:
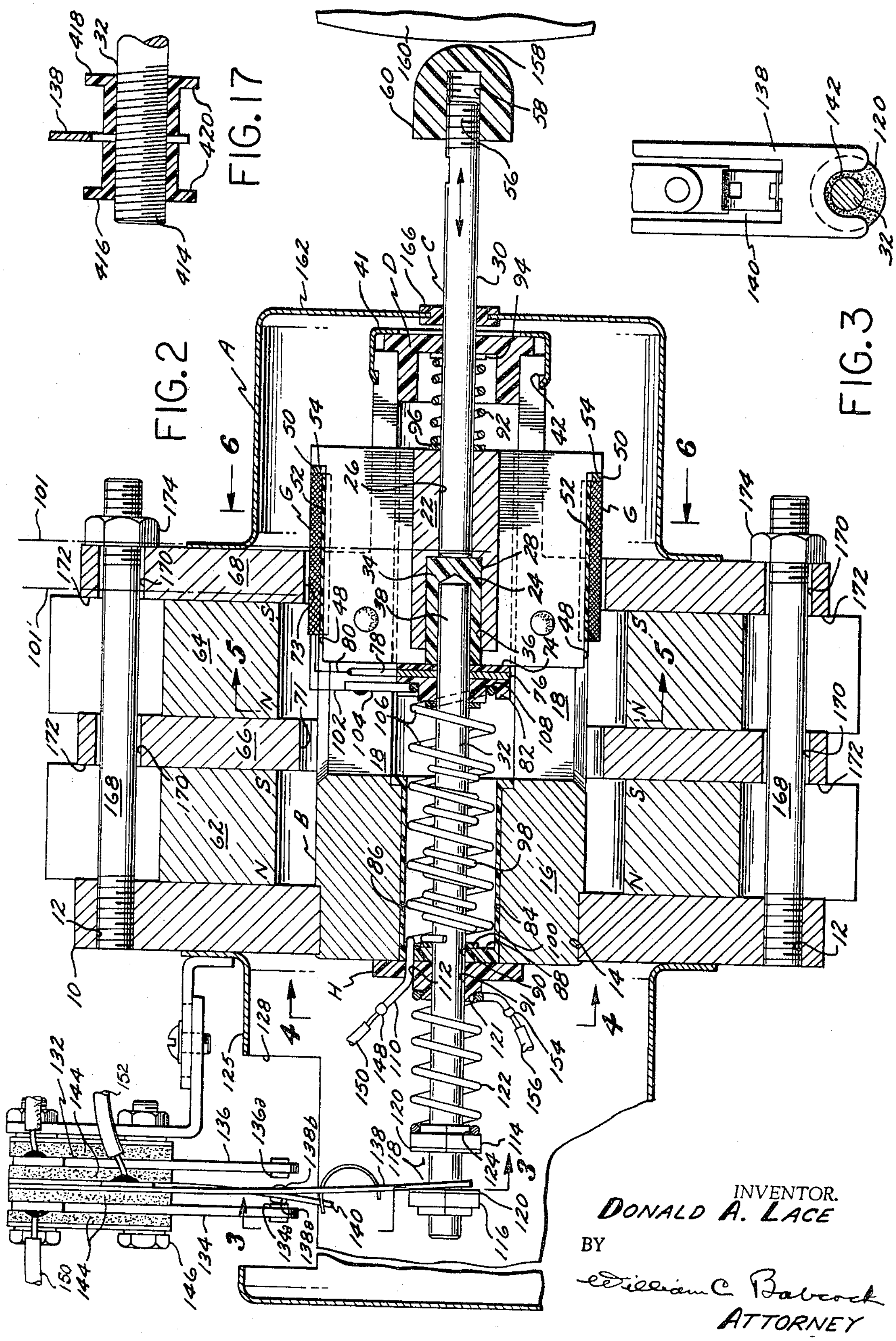
FIGURE 2 is a longitudinal cross-sectional view of the device shown in FIGURE 1, taken on the line 2—2 thereof.
FIGURE 3 is a combined end elevational and transverse cross-sectional view of a portion of the device shown in FIGURE 2, taken on the line 3—3 thereof.
FIGURE 17 is a cross-sectional view of alternate means of switch engagement wherein the shaft is insulated from the switch proper.

With continuing reference to the drawings, a first form A of the present invention is shown in FIGURE 2 that may be utilized for ringing a bell. This first form A includes a backing plate 10 formed from soft iron, or other ferromagnetic material. Backing plate 10 may be of any desired transverse cross section such as circular square, or the like, and a number of circumferentially spaced tapped bores 12 are formed therein. In addition, a centrally disposed opening 14 is formed in backing plate 10, which is preferably circular.

Figure 5:
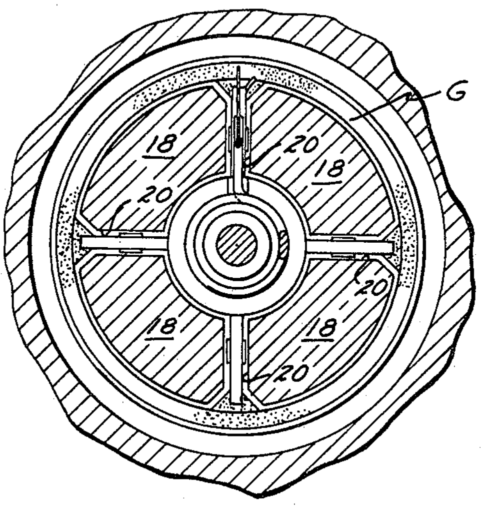
FIGURE 5 is a fragmentary transverse cross-sectional view of the device shown in FIGURE 2, taken on the line 5—5 thereof.

An outer pole B is provided that is likewise formed from soft iron or other ferromagnetic material. Pole B includes a rearwardly disposed section 16 of such transverse cross section that it may be press-fit into opening 14 and rigidly supported from the backing plate 10. A number of circumferentially spaced legs 18 extend forwardly from section 16, as can best be seen in FIGURES 5 and 6. Legs 18 are separated by longitudinally extending slots 20 which likewise may be seen in FIGURES 5 and 6.

A cylindrical body 22 is provided (FIGURE 2) in which a longitudinally extending bore 24 and counterbore 26 are formed which cooperatively define a body shoulder 28 at the junction therebetween. When body 22 is formed from a ferromagnetic material it serves as an inner pole, as will be explained hereinafter.

A shaft C is associated wth body 22 and includes a forward section 30 and a rear section 32. Section 30 is press-fit into the counterbore 26, as shown in FIGURE 2. A cylindrical plug 34 of electrical insulating material is positioned in bore 24. A longitudinally extending recess 36 is formed in plug 34 which grips a forward end portion 38 of rear shaft section 32. A first bearing D formed of an electrical insulating material is positioned on the forward end of the legs 18. The bearing D is removably held in position on the legs 18 by a clip 41.

Figures 8, 10:
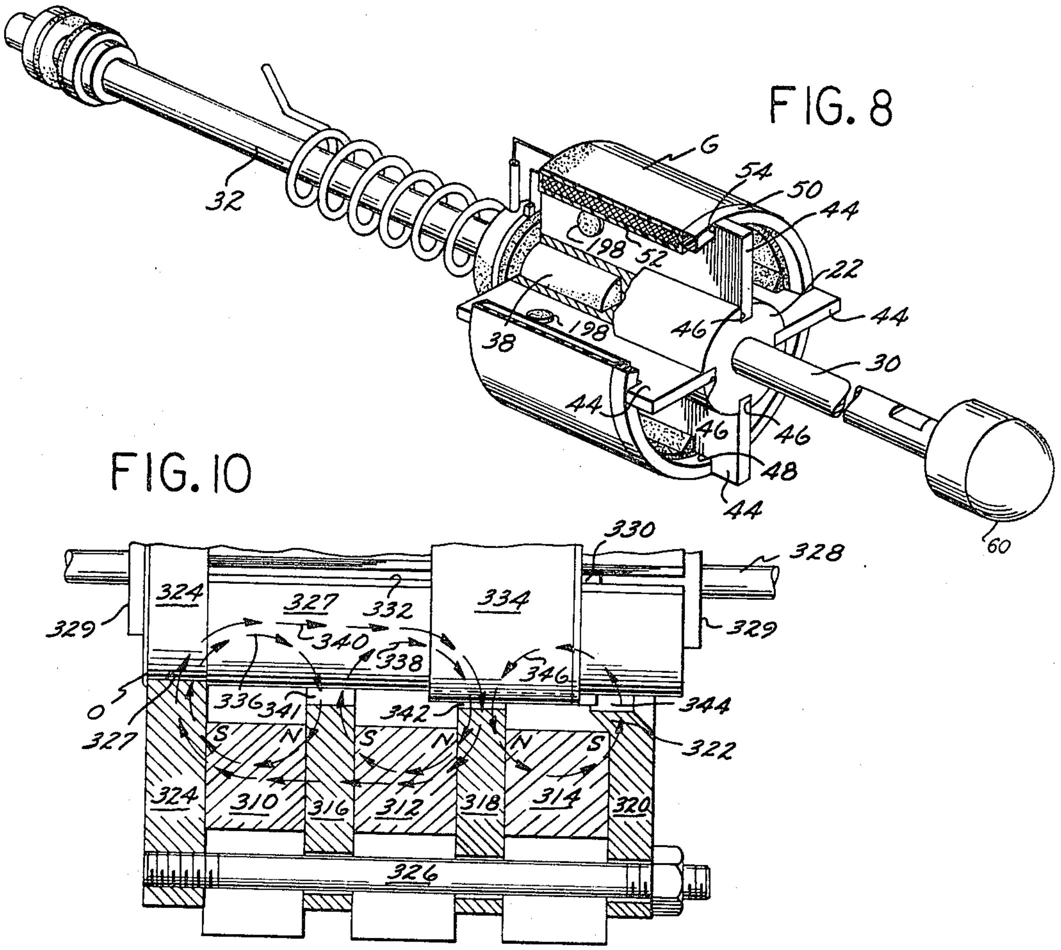
FIGURE 8 is a perspective view of the shaft, spider and coil assembly, with a portion of the coil and spider cut away.
FIGURE 10 is a combined transverse cross-sectional and side elevational view of a second form of the invention in which three permanent magnets and an outer pole are used to define the magnetic field, and the coil assembly as shown in this figure and in FIGURE 8 being capable of longitudinally traversing the entire length of the field so provided.

The body 22 and four plates 44 which project radially outwardly therefrom cooperatively provide a spider E, as best seen in FIGURE 8. The inner ends of the plates 44 are preferably fit into longitudinally extending recesses 46 formed in body 22. Recesses 48 are formed in the outer end portions of plates 44 and receive a resilient shock ring 50 therein as well as a coil G of wire.

The coil of wire G is preferably separated from the plates 44 by a sheath of insulating material 52, which if desired, can be extended completely around the coil in the manner shown in FIGURE 8. The forward ends of recesses 48 terminate in body shoulders 54 against which the resilient shock ring 50 abuts. The forward end of the shaft section 30 is provided with threads 56 that engage a tapped longitudinally extending recess 58 formed in an impact member 60. The impact member 60 (FIGURE 2) is removably supported on the forward end of the shaft section 30.

First and second magnets 62 and 64 which serve as flux-inducing means extend around the outer pole B and are radially spaced therefrom. Magnets 62 and 64 may be in the form of plates or separate segments, but irrespective of the shape thereof, the magnets are magnetized in a direction normal to the backing plate 10.

First and second pole extenders 66 and 68 that serve as flux-conducting means, are preferable in the form of soft iron plates in which centrally disposed openings 70 and 72, respectively, are formed. Openings 70 and 72 are substantially larger in diameter than the transverse cross section of the legs 18. The pole extenders 66 and 68, together with legs 18, cooperatively define two air gaps 71 and 73 through which magnetic lines of flux flows from the pole extenders to the outer pole B. The opening 70 must be of such diameter relative to the size of the legs 18 that the coil G can pass longitudinally through the air gaps 71 and 73, as will hereinafter be described.

A washer 74 formed from an electrical insulating material encircles the rear shaft section 32, and is in abutting contact with the rear surfaces of the plates 44, as may best be seen in FIGURES 2 and 8. A metal washer 76 also encircles shaft section 32, is in pressure contact therewith, and abuts against the rear surface of washer 74. An electrical conductor 78 projects from the metal washer 76, which conductor is connected to a lead 80 forming a part of coil G.

A third washer 82 formed from an electrical insulating material is provided which encircles the rear shaft section 32 and abuts against the rear surface of washer 76. A centrally disposed, longitudinally extending bore 84 is formed in the rear section 16 of the outer pole B. A cylindrical thimble 86 of an electrical insulating material is disposed in bore 84, which thimble includes a web 88 in which a centrally disposed bore 90 is formed.

A bearing H formed of an electrical insulating material is mounted on the rear surface of section 16, as can best be seen in FIGURE 2. A bore 91 extends longitudinally through bearing H in which the shaft section 32 is slidably mounted. A first helical spring 92 encircles the forward shaft section 30, and the ends of this spring are in abutting contact with two resilient washers 94 and 96. The washer 94, as can best be seen in FIGURE 2, is affixed to the interior surface of bearing D, and the washer 96 is affixed to the forward face of the body 22.

A second spring 98 encircles the shaft section 32 and abuts against the rear surface of the third washer 82. The rear end of spring 98 is in contact with a washer 100 that abuts against the forward face of web 88. Springs 92 and 98 are of such length and resiliency as to dispose the spider E and coil G in the static position shown in FIGURE 2 wherein the transverse center line 101 of the coil G is substantially in alignment with the forward face of the second pole extender 68 when direct current is to be used to power the device. When alternating current is to be employed to actuate the device, the springs 92 and 98 are of such length as to dispose the coil G in a static position wherein the center line 101 occupies the position of the center line 101' shown in FIGURE 2.

A lead 102 extends from coil G that is connected by soldering, or the like, to a connector 104 affixed to one end of a helical spring 106 of substantially larger internal diameter than the external diameter of shaft section 32. Spring 106 is formed from an electrical conducting material, and the forward end thereof engages a groove 108 formed in the rear of the third washer 82 to maintain the spring 106 out of contact with shaft section 32. An extension 110 is provided on the rear end of spring 106, which extension projects through an opening 112 formed in the bearing H.

A forwardly disposed collar 114 and a rearwardly position collar 116 are held in a desired longitudinal spacing on the rear portion of shaft section 32 by conventional means, such as set screws (not shown), or the like. Collars 114 and 116 are separated by a space 118. Two resilient washers 120 of an electrical insulating material are mounted on the adjacent faces of collars 114 and 116. A recessed portion 121 is formed on the rear part of bearing H that is engaged by an electrical conducting helical spring 122 which is spaced from the shaft section 32.

The rear end of spring 122 is in pressure contact with a body shoulder 124 formed on the collar 114. A first cup-shaped housing is provided that is affixed to the rear surface of the backing plate 10 by conventional means, and this housing has an opening 128 formed in the upper portion thereof.

A bracket 130 is also supported from the backing plate 10, which in turn supports a single pole, double throw switch 132. Switch 132 includes two electrical conducting members 134 and 136, on the lower portions of which contacts 134*a* and 136*a* respectively, are affixed. The switch 132 is a commercially available item, and patent protection is not sought thereon per se, however the manner of its actuation and incorporation into the device of the invention is considered to be novel.

A resilient blade 138 is included as a part of switch 132, and is situated between the conducting members 134 and 136. By toggle means 140 the blade 138 is caused to occupy either of two positions: the first being one in which a contact 138*a* thereon is in pressure engagement with the contact 134*a*, and the second being one in which a contact 138*b* is in pressure engagement with contact 136*a*.

Blade 138 is fabricated from an electrical conducting material, and has a lower grooved portion 142 (see FIG. 3) which is at all times out of electrical engagement with that part of shaft section 32 situated between the collars 114 and 116. The blades 138 and the two electrical conducting members 134 and 136 are electrically insulated from one another by sheets 144 of an electrical insulating material such as mica, plastic, or the like. Sheets 144, conductors 134 and 136, and blade 138 are held together as a unit by bolts 146, or other conventional fastening means.

To permit operation of the device from a single source of direct current, the extension 110 is, by soldering 148, electrically connected to a conductor 150, which in turn is electrically connected to member 134 by soldering, or the like. The blade 138 is, by soldering or the like, connected to an electrical conductor 152 that extends to the positive side of a single source of direct current (not shown) such as a battery.

A bead of solder 154, or the like, electrically connects the spring 122 to a conductor 156 which extends to the negative side of a source of direct current (not shown) such as a battery. The springs 92 and 98 are of such length and resiliency as to dispose the coil G in the static position for direct current, as shown in FIGURE 2, when the coil is not electrically energized. In this static position that washer 120 adjacent the collar 116 holds blade 138 in a position where contacts 134*a* and 138*a* are in engagement.

The impact member 60 is separated a distance 158 from a bell 160 when the coil G is in the static position. When the coil G is in the static position shown and the circuit between the direct source of electricity (not shown) and the conductors 150 and 156 is completed, the coil is electrically energized. The flow of current from the source (not shown) passes through the conductor 156 to spring 122, and from this spring through collar 114 to the rear shaft section 32. Current flows from shaft section 32 through washer 76 to conductor 80 and thence into coil G. From coil G current passes through the lead 102, connector 104, spring 106, extension 110, soldering bead 148, conductor 150, conducting member 134, contacts 134*a* and 138*a*, blade 138 to conductor 152, which extends to the positive side of the source of direct current (not shown).

The magnets 62 and 64 are magnetized in a direction parallel to the outer pole B, and are so oriented that the south pole of magnet 62 is adjacent pole extender 66, with the south pole of magnet 64 being adjacent pole extender 68. The polarity of magnets 62 and 64 is indicated by the letters N and S on FIGURE 2.

When the circuit just described is completed, the current flows through coil G in a direction wherein the polarity of the end of the coil nearest the pole extender 68 is north, and the coil G, spider E and shaft C are moved to the left until the washer 120 adjacent the collar 124 moves the blade 138 to a position where the contact 138*a* is out of engagement with contact 134*a*. Due to the toggle means 140, the switch 132 is of a type in which contacts 138*a* and 134*a* thereof are brought into engagement by forward movement of the lower portion of blade 138, and contacts 138*b* and contact 136*a* are brought into engagement by rearward movement of the lower portion of the blade.

During the time the coil G, spider E and shaft C (FIGURE 2) move to the left, the spring 98 is compressed. When the collar 114 contacts blade 138 to move the lower portion thereof to the left, as shown in FIGURE 2, the circuit to coil G is broken and the coil is no longer repelled from the pole extender 68 whereby the compressed spring 98 drives the shaft C, spider E and coil G to the right with sufficient force to cause the coil to move past the static position shown. As the coil G moves to the right past the static position, the contact 138*a* is again brought into engagement with contact 134*a* to re-establish the circuit to the coil G, with the energization of this coil setting up a magnetic field that opposes movement of the coil to the right, and acts as a brake. However, this braking action is not sufficient to overcome the momentum of shaft C, spider E, and coil G to prevent the impact member 60 from striking the bell 160 and causing it to resonate.

Thereafter, or immediately after the impact, the magnetic field set up in coil G causes movement of the coil, shaft C and spider E to the left as a unit from this first position towards a second position, whereby the impact member 60 has a period of minimum dwell in contact with bell 160. It will be apparent that by varying the longitudinal spacing between the adjustable collars 114 and 116 the magnitude of throw of the shaft C to the left to the second position can be controlled.

If it is desired to impart a rapid oscillating action to the shaft C and impact member 60 it may be accomplished by forming the body 22 from a lightweight metal such as aluminum, magnesium, or the like, which have low inertia. Should it be desirable to increase the force with which the impact member 60 contacts the bell 160, this may be achieved by forming the body 22 from soft iron or other paramagnetic material.

When the body 22 is formed from iron it is relatively heavy, and lends increased momentum to the shaft C, spider E and coil G in compressing the spring 98 when moving to the left to the second position, as well as when moving to the right to the first position to strike bell 60. The body 22, when formed from a ferromagnetic material acts as an inner pole that is capable of carrying magnetic flux to the extent that the outer pole B does not become over saturated, whereby the operating efficiency of the device is accordingly increased. When the body 22 acts as an inner pole a portion of the magnetic flux lines that flow across gap 73 is shifted to follow it as the body 22 moves to the left, and continue to exert a repelling action on the coil G. If magnets 62 and 64 are oriented as shown in FIGURE 2, an elongate longitudinally extending field of magnetic flux is provided that is of substantially greater intensity at the gap 73 between the second pole extender 68 and the coil G than at the gap 71 between first pole extender 66 and the outer pole B.

Figure 1:
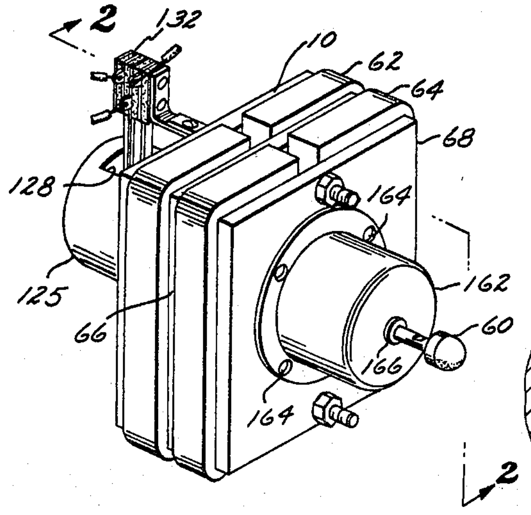
FIGURE 1 is a perspective view of the invention illustrated as a bell ringer.

A second cup-shaped housing 162 is provided that is removably affixed to the forward face of second pole extender 68 by screws 164 or the like, as best seen in FIGURE 1. Housing 162 supports a centrally disposed washer 166 which slidably engages shaft section 30. The purpose of housings 125 and 162 is to prevent entry of dust, dirt and other foreign material into the confines of the device.

Figure 9:
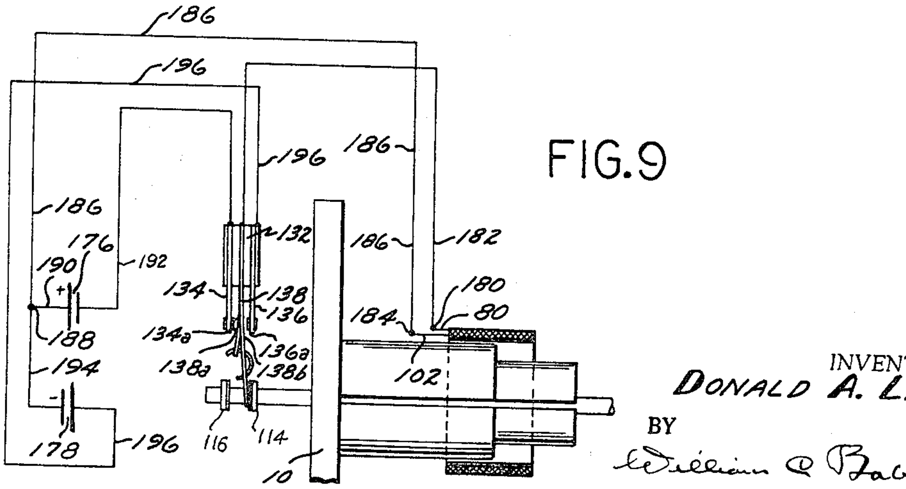
FIGURE 9 is a diagrammatic view of the coil-energizing circuit in combination with a portion of the device shown in FIGURE 2.

Form A of the device is conveniently held together as a unit by stud bolts 168 that extend through bores 170 in pole extenders 66 and 68, and slots 172 in magnets 62 and 64 to engage the tapped bores 12 as shown in FIGURE 2. The forward threaded ends of bolts 168 are engaged by nuts 174. Should it be desired to electromagnetically drive the shaft C, spider E and coil G to the right, as well as to the left, (FIGURE 2) the wiring circuit shown in FIGURE 9 may be employed.

When collar 116 moves forwardly sufficiently to move blade 138 to the extent that contacts 134*a* and 138*a* are in engagement, an electric circuit from the battery 176 to the coil G is completed. The flow of current from battery 176 to coil G is through conductor 192, member 134, contacts 134*a* and 138*a*, blade 138, conductor 182, junction 180 and lead 80. After flowing through coil G the current flows through lead 102, junction 184, conductor 186, junction 188 and conductor 190 to the positive side of the battery. This flow of current in the completed circuit is in such a direction that the magnetic field set up in coil G tends to move the coil, shaft C and spider E to the left as a unit as viewed in FIGURE 9. Movement of the coil G to the left compresses spring 98 (as discussed in FIGURE 2).

When the coil G, shaft C and spider E move to the left a sufficient distance then, the collar 114 engages blade 138 and moves the same to dispose contact 138*b* into engagement with contact 136*a*. The circuit to battery 176 is broken and the blade 138 moves contacts 136*a* and 138*a* into engagement and current then flows from battery 178 to coil G in a direction as to tend to move the coil, spider E and shaft C to the right as viewed in FIG. 9.

With contacts **138*b* and 136*a* in engagement, current flows from battery 178 through a conductor 194 to junction 188, and then through conductor 186 to junction 184, lead 102 to coil G. The current flows from coil G through lead 80, junction 180, conductor 182, blade 138, contacts 138*b* and 136*a*, member 136, and conductor 196 to the positive side of battery 178**.

Current of opposite polarity will be alternately supplied to the coil G as it oscillates, with the paths of the current flow being as above described.

In the construction of form A of the present invention just described it is highly desirable to bond buttons 198 formed of a plastic such as Teflon manufactured by Du Pont de Nemours of Wilmington, Del., to the sides of the plates 44 of spider E to maintain the spider in a centered position on the legs 18. In this centered position the spider E oscillates relative to the legs 18 with a minimum of drag. Also, when the body 22 of form A of the invention is fabricated from iron or a like material, it is desirable to form the spider E of a paramagnetic material so that the spider and body will cooperatively carry a substantial percentage of the magnetic flux lines and eliminate the possibility of saturation of the outer pole B.

Figure 7:
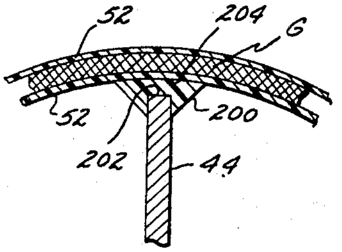
FIGURE 7 is an enlarged fragmentary transverse cross-sectional view of a portion of the coil and supporting spider.
Figure 6:
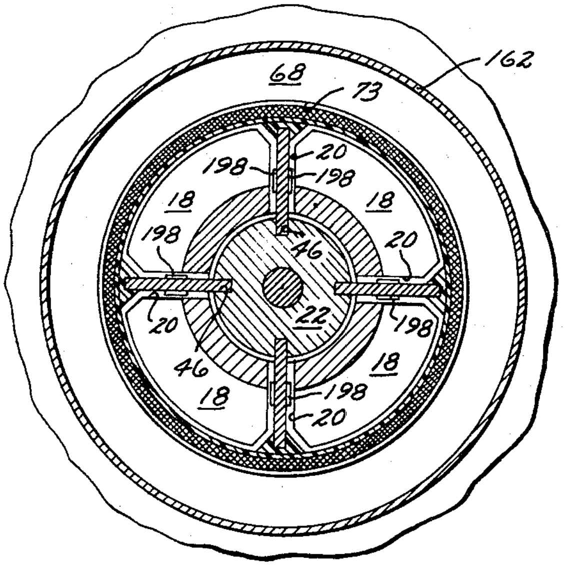
FIGURE 6 is a fragmentary transverse cross-sectional view of the device shown in FIGURE 2, taken on the line 6—6 thereof.
Figure 4:
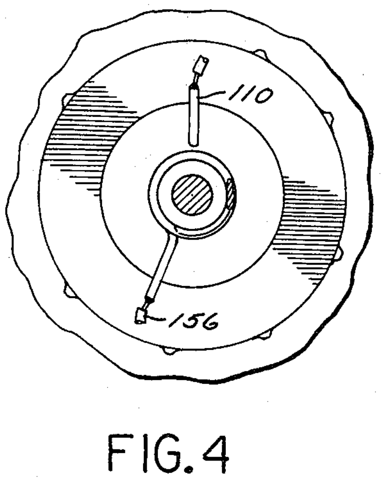
FIGURE 4 is a fragmentary end elevational view of the device shown in FIGURE 2, taken on the line 4—4 thereof.

To prevent inadvertent cutting of the wires in the coil G at it oscillates, coil supports 200 in the form of longitudinally extending strips of a plastic material are mounted on the outer ends of plates 44, as may best be seen in FIGS. 6 and 7. Each support 200 is of generally triangular transverse cross section, and a longitudinal slot 202 is formed therein that engages an outer end portion of one of the plates 44. It will be noted in FIGURE 7 that each support 200 has a relatively wide curved surface 204 that is in abutting contact with sheath 52.

Figure 12:
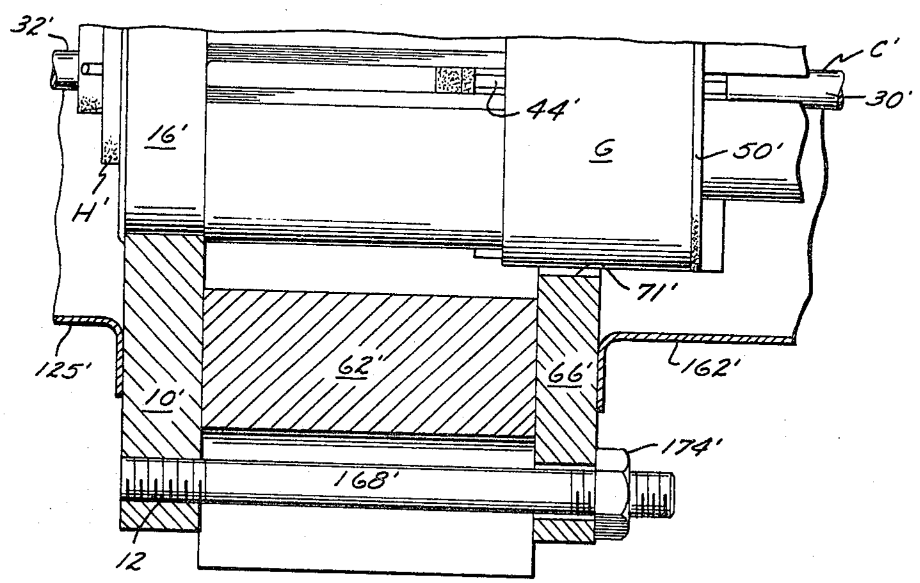
FIGURE 12 is a fragmentary combined longitudinal cross-sectional and side elevational view of a fourth form of the device.

The form J of the present invention shown in FIGURE 12 is similar in structure to that form illustrated in FIGURE 2 previously described. Form J of the invention incorporates but one magnet. Inasmuch as form J includes the same elements comprising form A of the invention, like identifying letters and numerals are used herein, but to which a prime has been added. The operation of this form of the invention is the same as that of form A, and accordingly need not be repeated. When alternating current is used as a source of power with either form A or J of the invention, the switch 132 need not be employed.

Figure 11:
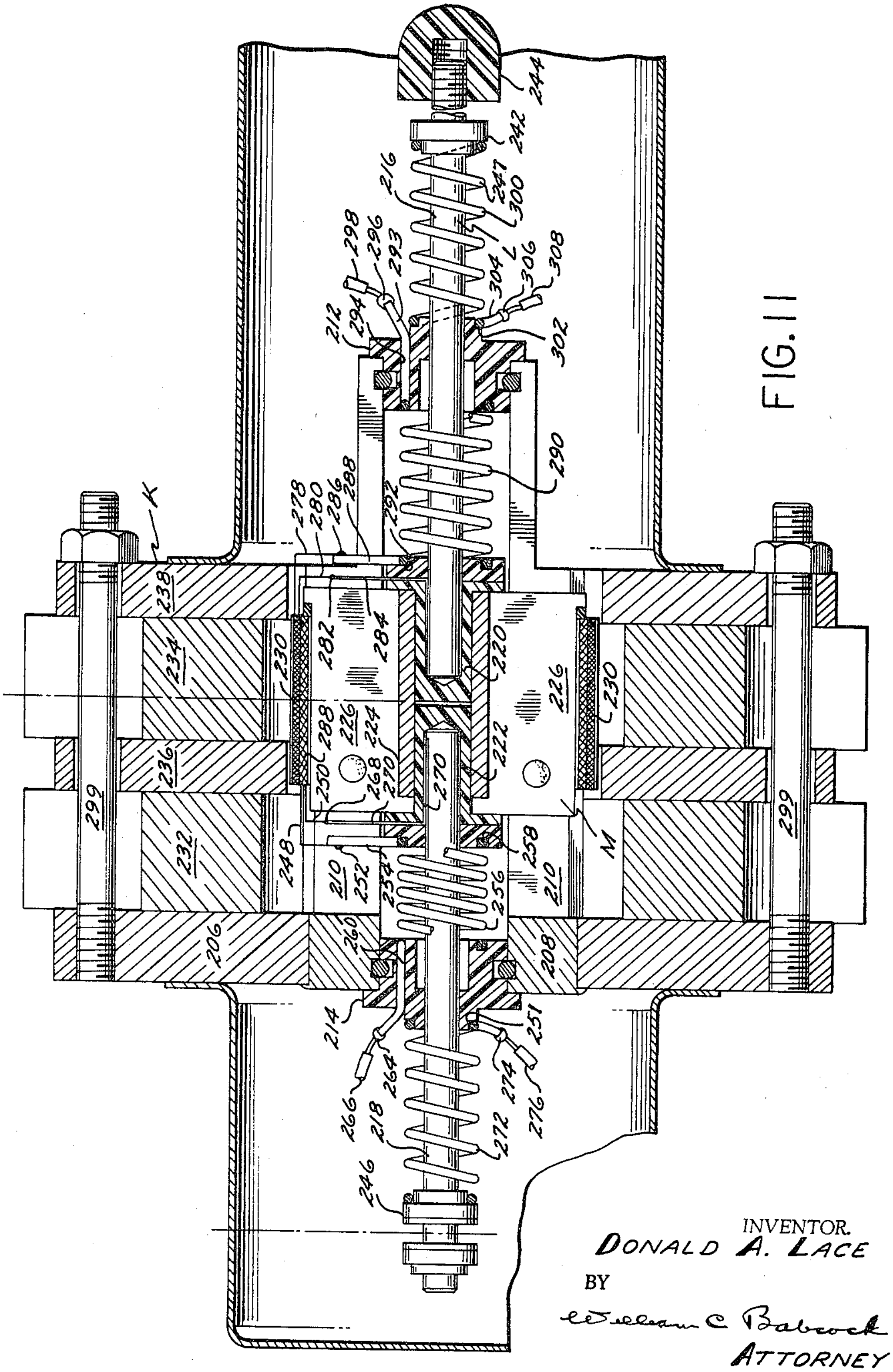
FIGURE 11 is a longitudinal cross-sectional view of a third form of the device.

Another form of the invention K is shown in FIGURE 11 which can be operated by a transistorized circuit, or used to emit an electrical signal. From K includes a backing plate 206 formed from soft iron, or other ferromagnetic material, from which an outer pole 208 projects forwardly. Pole 208 is likewise formed from a ferromagnetic material, and includes a number of parallel, circumferentially spaced legs 210. First and second bearings 212 and 214 are supported on the forward and rear ends respectively, of pole 208.

A shaft L is provided that is defined by a forward section 216 and a rear section 218. Adjoining ends of the shaft sections 216 and 218 are inserted in plugs 220 and 222 respectively, which plugs are held within the confines of a cylindrical body 224. A number of plates 226 project outwardly from body 224 to define a spider M on which a first coil of wire 228 which serves as a power winding is mounted. A second coil of wire 230, the sensing winding, envelopes the coil 228.

First and second permanent magnets 232 and 234 and first and second pole extenders 236 and 238 are disposed forwardly of backing plate 206, and held in abutting contact with one another by bolts 299. A first collar 242 is mounted on first shaft section 216, as well as an impact member 244 which is supported on the forward end of this shaft section. A second collar 246 is mounted on the rear shaft section 218.

A first helical metallic spring 247 encircles shaft section 216, and the ends of this spring are in abutting contact with first collar 242 and first bearing 212. Both shaft sections 216 and 218 and collars 242 and 246 are formed from an electrical conducting material. Two leads 248 and 250 extend from coil 228. The lead 248, by solder 252, is connected to an inwardly projecting extension 254 of a metallic helical spring 256.

The spring 256 is of sufficient internal diameter as to be spaced from the second shaft section 218 when it extends therearound in the manner shown in FIGURE 11. The right-hand end of the spring 256 is supported in a groove 258 formed in the plug 222. A rear extension 260 of spring 256 passes rearwardly through a bore 262 formed in the second bearing 214. The extension 260 is connected by solder 264 to an electrical conductor 266. The lead 250 (FIGURE 11) is connected by solder 268 to an L-shaped electrical conductor 270 that is held in abutting contact with the second shaft section 218 by the second plug 222.

A helical spring 272 encircles the second shaft section 218, and the rear end of this spring is in abutting contact with the collar 246, with the forward end thereof in engagement with a rearwardly disposed recessed portion 251 of the bearing 214. Spring 272, by solder 274, is connected to a conductor 276. The conductors 266 and 276 are connected to a transistorized source of power (not shown). The polarity of current from this source of power is dependent on the polarity of a control current supplied to the source.

Two leads 278 and 280 extend from the sensing coil 230. By means of a drop of solder 282, the lead 280 is connected to an L-shaped conductor 284 that is held in abutting contact with shaft section 216. By solder 286, the lead 278 is connected to an upwardly projecting extension 288 of a metallic helical spring 290 that is of such diameter as to be spaced from the first shaft section 216 when it encircles the same. The rear end of spring 290 is supported in a recess 292 formed in the forward face of the plug 220. A forwardly disposed extension 293 of spring 290 projects through a bore 294 formed in first bearing 212. The extension 293 is connected by solder 296 to a conductor 298 that extends to the transistorized circuit (not shown).

A metallic helical spring 300 encircles the forward shaft section 216, and the forward end of this spring is in abutting contact with the collar 242 and the rear end thereof engages a recessed portion 302 of the first bearing 212. An extension 304 of spring 300 is connected to an electrical conductor 308 by solder 306. As the coil 230 moves longitudinally relative to the magnets 232, 234 and pole extenders 236, 238, an electrical current is generated therein which flows through the leads 278, 280 to conductors 298 and 308 to control the transistorized source of power (not shown). When the transistorized source of power is actuated by current from the sensing coil 230, it discharges current that alternates in polarity through conductors 266 and 276 to energize the power winding 228 and cause the form K of the invention to operate in the same manner as form A thereof shown in FIGURE 2. As shown in FIGURE 11, the legs 210 extend forwardly from the forward face of backing plate 206, which gives a greater throw to the shaft L during oscillation thereof.

Another form O of the device is shown in FIGURE 10 which is similar to form A of the invention shown in FIGURE 2. In form O, three magnets 310, 312 and 314 are provided, and two pole extenders 316, 318 are situated between the magnets 310, 312 and 312, 314 respectively. A third pole extender 320 which has a rearwardly extending inner end portion is positioned in abutting contact with the forward end of magnet 314.

The magnets 310, 312 and 314 and the pole extenders 316, 318 and 320 are held in stacked relationship (FIGURE 10) relative to backing plate 324 by stud bolts 326. A longitudinally slotted outer pole 327 projects from backing plate 324, and a shaft 328 is longitudinally movable in this pole in bearings 329. A spider 330 mounted on shaft 328 extends through slots 332 in the outer pole 327 to support a coil 334 that may be electrically energized by any one of the various means previously described relative to the other forms of the invention.

The polarity of magnet 310 is such that the north pole thereof is positioned adjacent to the pole extender 316. The south pole of magnet 312 is disposed adjacent the forward face of pole extender 316, and the magnets 312 and 314 are so disposed that the rear and forward faces, respectively, of the pole extender 318.

The first manget 310, backing plate 324, outer pole 327 and pole extender 316 cooperatively define a first magnetic flux field 336 flowing in the direction of the arrows as shown in FIGURE 10. The second magnet 312 and the first and second pole extenders 316, 318 in combination with the outer pole 327, cooperatively define a second magnetic field 338. The magnetic flux in both fields 336 and 338 flows in a clockwise direction, as shown by arrowed lines in FIGURE 10. The two fields 336 and 338 cooperatively define a third elongate, deformed magnetic field 340 (also indicated by arrowed line) that flows from the outer pole 327 to the second pole extender 318. The pole extenders 316, 318 and 320 cooperate with the outer pole 327 to define three air gaps 341, 342 and 344 respectively also in a clockwise direction.

The third magnet 314, outer pole 327 and second and third extenders 318 and 320 cooperatively define a fourth magnetic field 346 as shown in FIGURE 10 wherein the flow of magnetic flux is in a counterclockwise direction. The direction of lines of force of the composite magnetic field 340 and fourth magnetic field 346 flows radially outwardly from the outer pole 327 across the air gap 342 into the second pole extender 318. The two fields 340 and 346 are additive and compress the lines of flux in a longitudinal direction as they flow across the air gap 342. The two fields 336 and 338 are subtractive whereby the flux density of gap 342 is accordingly substantially greater than that of either gap 341 or gap 344.

The coil 334 is normally statically positioned within air gap 342, whereby upon energization of the coil 334 the maximum force will be exerted to move the coil and its attached shaft 328 linearly. Alternately, if shaft 328 and coil 334 are moved mechanically then a current of varying strength would be discharged from leads attached to the coil (not shown) as the latter moves through the magnetic flux at the air gaps 341, 342 and 344.

Figure 14:
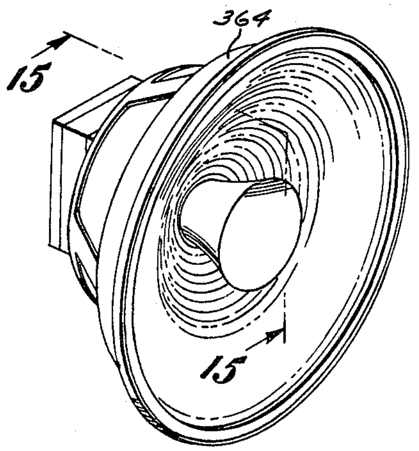
FIGURE 14 is a perspective view of a sound reproduction unit that incorporates both a voice and a feedback coil.
Figure 15:
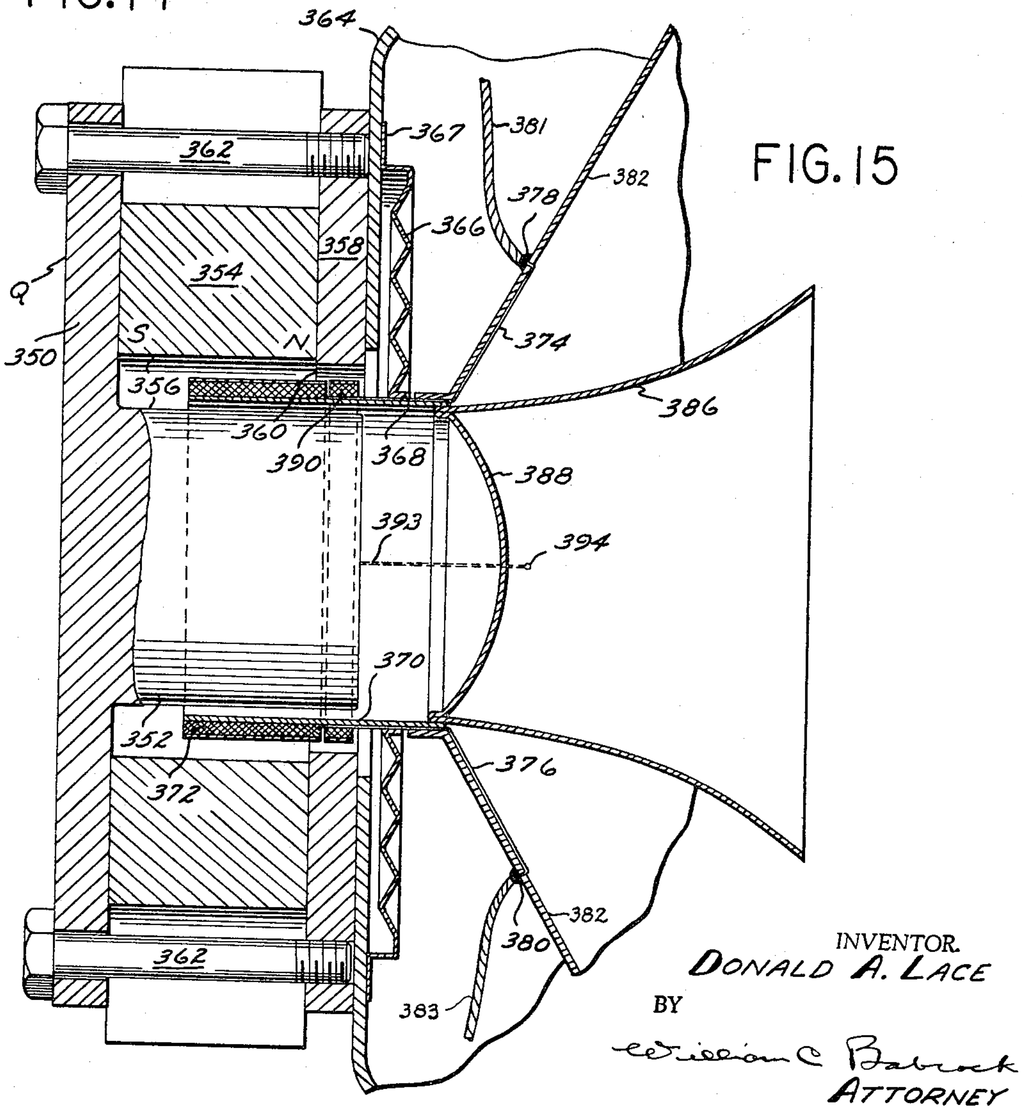
FIGURE 15 is a longitudinal cross-sectional view of the unit shown in FIGURE 14, taken on the line 15—15 thereof.

A sound reproduction unit Q is shown in FIGURES 14 and 15 which has a pole 352 extending forwardly from a backing plate 350 forming a part of the unit. A permanent magnet 354 either in the form of a plate or a number of segments extends around pole 352 and is separated therefrom by an annulus-shaped space 356. The magnet 354 is magnetized in a direction parallel to the longitudinal dimension of pole 352. A pole extender 358 is in abutting contact with the forward surface of magnet 354. The pole extender 358 and pole 352 define an air gap 360 therebetween.

Backing plate 350, magnet 354 and pole extender 358 are held together as an integral unit by a number of bolts 362, as shown in FIGURE 15. A frusto-conical support 364 that extends forwardly and outwardly relative to pole extender 358 is affixed to the forward face thereof by conventional means. A circular corrugated diaphragm 366 has a flanged peripheral portion 367 affixed to support 364 by conventional means.

A centrally disposed opening is formed in diaphragm 366 that is defined by a cylindrical flange 368. A cylindrical shell 370 is bonded to the interior surface of flange 368 and extends rearwardly and forwardly therefrom. A voice coil 372 is mounted on the forward portion of shell 370 within the air gap 360, and two leads 374 and 376 extend therefrom to spots of solder 378 and 380 or other electrical conducting fastening means on a cone 382 which projects forwardly and outwardly from the shell. Spots of solder 378 and 380 are connected to insulated conductors 381 and 383 that extend to an audio transformer (not shown) to receive electrical signals therefrom. A frusto-conical shell 386 having a web 388 extending transversely across the rear end thereof is mounted in the forward end portion of shell 370 for high frequency sound reproduction.

A feedback coil 390 is mounted on the rear interior portion of shell 370, and is at least partially positioned in the air gap 360. Two identical electrical conductors 393 extend from coil 390 to spots of solder 394, or other electrical conducting fastening means on cone 382. The voice coil 372, shell 370, and feedback coil 390 oscillate longitudinally relative to the pole extender 358 in response to the fluctuating electric signal that flows to the voice coil 372 from an audio output transformer (not shown).

It is common practice to take small amounts of voltage from the output of such a transformer and feed it back to the amplifier (not shown) associated with the transformer prior to signal transmission to the speaker. The fed back signal contains distortions that are opposite to the distortions existing in the output from the transformer. Combining the original signal and the feedback signal provides a resultant input to the amplifier of such wave pattern that when it is amplified, the resultant output more closely resembles the wave pattern of the original signal than if such feedback had not been employed. However, the negative feedback above described does not correct for important substantial distortions that take place in the speaker itself and distorts speaker output, i.e., sound reproduction.

I have found that by providing a feedback coil 390 mounted upon shell 370, such coil may be employed to minimize these distortions. Movement of shell 370 is caused by the input signal to voice coil 372. Since the voice coil and shell 370 operate within the magnetic flux flowing across gap 360, a fluctuating electric current will be generated that has a wave pattern related to that which flows to the voice coil. The movement of shell 370 is also conditioned by the physical characteristics of the speaker itself, and hence the said fluctuating electric current will also reflect any mechanical distortions in the wave pattern brought about by such physical characteristics. The feedback coil 390 also oscillates with shell 370 and primarily senses fringe leakages across annular space 356. Hence the current flowing in feedback coil 390 is primarily representative of the mechanical distortions engendered by the speaker. This current is then fed back in negative feedback fashion to the audio amplifier input to correct its output to the speaker in order to attain a higher level of fidelity.

Figure 16:
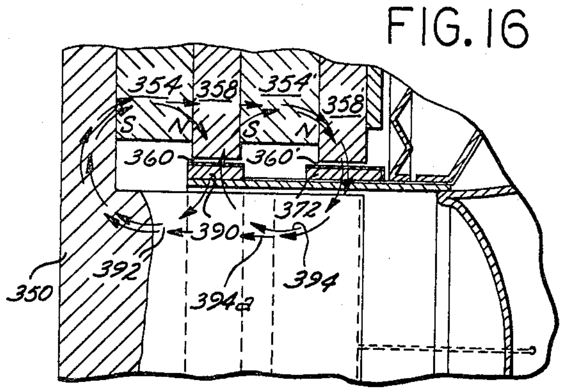
FIGURE 16 is a fragmentary longitudinal cross-sectional view of an alternate form of sound reproduction unit.

The alternate form of sound reproduction unit shown in FIGURE 16 is substantially the same as the one above described, however it is even more receptive to sensing distortions because of the arrangement employing an intermediate pole extender which serves to concentrate the fringe leakage losses in another air gap. Thus, a second magnet 354' and pole extender 358' provide the air gap 360' in which the voice coil 372 is located, and feedback coil 390 is so positioned on shell 370 that it is within the magnetic flux flowing across gap 360.

Magnets 354 and 354' are magnetized in a direction parallel to the longitudinal direction of pole 352. Back plate 350, magnet 354, pole extender 358 and pole 352 cooperatively define a first magnetic field 397 shown by arrowed line in FIGURE 16. A second magnetic field 399 shown by arrowed line in FIGURE 16 is provided by magnet 354', pole extenders 358, 358' and pole 352. In both of these fields the flow of the magnetic flux is in a clockwise direction. Hence the two fields are additive and cooperatively produce a third magnetic field **394*a*, also shown by arrowed line in FIGURE 16. Consequently, the fringe leakage losses will be concentrated within the gap 360 wherein coil 390** senses substantially all of such losses.

Figure 13:
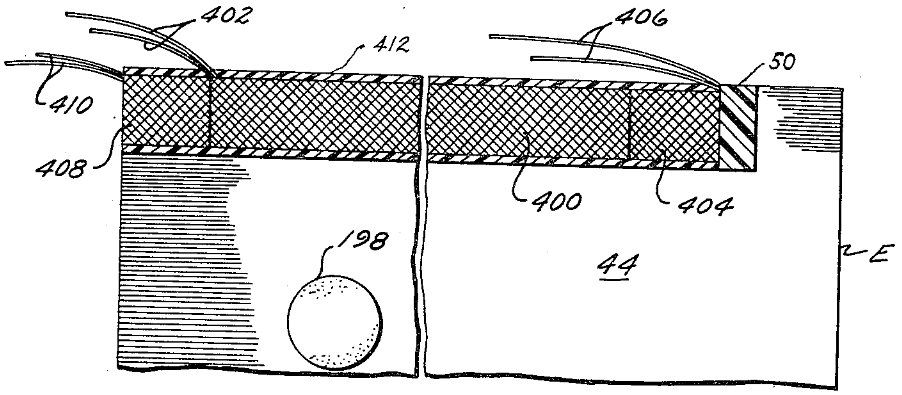
FIGURE 13 is a fragmentary longitudinal cross-sectional view of a second form of coil and spider structure embodying the use of two sensing coils.

It will be apparent that numerous modifications may be made in the structure of the devices previously described. In the event the shell and power coil are to experience large excursions, such travel may be attenuated by employing dampening coils located at the extreme positions of travel of the shell. For instance, a power coil 400 with leads 402 extending therefrom may be mounted on plates 44 of spider E as shown in FIGURE 13. A first dampening or sensing coil 404 is mounted on the forward end of plates 44, sandwiched between coil 400 and the resilient shock ring 50. Leads 406 extend from the first sensing coil 404. A second sensing coil 408 is mounted on plates 44 rearwardly of power coil 400. Leads 410 extend from coil 408. If desired, the three coils may be sheathed in a suitable protective material 412 as shown in FIGURE 13. The above described spider and coil structure may be used in lieu of the one shown in FIGURE 11 if desired.

In the event it is undesirable to use the rear shaft section 32 as a part of the electric circuit, threads 414 are formed thereon as shown in FIGURE 17. Two tapped flanged spools 416 and 418 engage threads 414 and serve to move blade 138 from one position to another as the shaft oscillates. By varying the longitudinal distance 420 as shown in FIGURE 17, the shaft section 32 can be subjected to any desired throw.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A linear motion device, comprising, in combination:

an electromagnetic structure comprising an outer pole means and magnetomotive force generating means, said outer pole means including a longitudinally extending element positioned within said force generating means, and a plurality of pole extending means juxtaposed to said force generating means and extending around said element, at least two of said pole extending means being spaced from said element to define a first and second air gap therebetween, said air gaps being longitudinally displaced from one another coextensive with said element, whereby a pair of magnetic fields are created each including one of said gaps, a shaft positioned within said outer pole and arranged to translate linearly within said force generating means, a coil fixedly mounted upon said shaft and arranged to be normally positioned within said second air gap, said magnetic fields being so arranged as to cooperate to concentrate substantially all fringing flux lines in said first air gap, and means for applying power to said coil to move same from said second air gap towards said first air gap, whereby the maximum linear force is generated to move said coil between said gaps and a greater flux concentration occurs at said second air gap.

2. A linear motion device according to claim 1 including resilient shock resisting means mounted adjacent said coil to translate therewith whereby damage to said coil is minimized.

3. A linear motion device according to claim 1 wherein the transverse center line of said coil extends in a direction located substantially between the confines of that pole extending means which defines said second air gap, and said coil projects outside of said air gap.

4. A linear motion device according to claim 1 further including, in combination:

switch means arranged to transmit power to said coil, switch actuating means having a portion thereof mounted upon said shaft and arranged to be operated upon motion of said shaft at a time prior to the extremity of travel of said shaft to conduct power to said coil in such manner as to induce motion of said coil opposing its then direction of travel.

5. A linear motion device according to claim 1 for use as an audio speaker wherein said shaft is in the form of a tubular shell mounted coaxially with said element, and said coil is a voice coil adapted to receive an output signal from an audio generator, a diaphragm connected to said shell to be oscillated thereby.

6. An audio speaker according to claim 5 wherein a second coil is mounted upon a shell and located within said first air gap whereby a voltage is generated within said second coil representative of the motion of said shell.

7. A linear motion device according to claim 1 wherein said shaft has a member mounted thereon inwardly of said coil, said member being of a ferromagnetic material, said member serving to conduct a portion of said magnetomotive force therethrough whereby to prevent over saturation of said outer pole.

8. A linear motion device according to claim 1 wherein said shaft has a member mounted thereon inwardly of said coil, said member being of a ferromagnetic material, said element having a latching protuberance and being so constructed and arranged that upon motion of said shaft the member is brought within a predetermined distance of said protuberance, whereby said member is magnetically forcefully attracted to said element into a latched position.

References Cited

UNITED STATES PATENTS

| | | | |
|---|---|---|---|
| 665,917 | 1/1901 | Le Pontois | 310—31 |
| 2,118,862 | 5/1938 | Rayment et al. | 310—27 |
| 2,328,337 | 8/1943 | Hanchock | 310—27 |
| 2,781,461 | 2/1957 | Booth, et al. | 310—27 |
| 2,842,688 | 7/1958 | Martin | 310—27 |
| 2,925,503 | 2/1960 | Efromson | 310—27 |
| 3,114,429 | 12/1963 | Miner | 179—115 |
| 3,149,254 | 9/1964 | Carter et al. | 179—115 |
| 3,184,622 | 5/1965 | Levine | 310—34 |
| 3,240,882 | 3/1966 | Eichler | 317—173 |
| 3,079,472 | 2/1963 | Sariti | 317—173 |
| 1,925,561 | 9/1933 | Lake | 340—403 |
| 2,860,183 | 11/1958 | Courad | 179—1 |
| 3,047,661 | 7/1962 | Wiater | 179—1 |

MILTON O. HIRSHFIELD, *Primary Examiner.*

D. F. DUGGAN, *Assistant Examiner.*

U.S. Cl. X.R.

179—115.5